United States Patent
Falde et al.

(10) Patent No.: US 11,373,262 B2
(45) Date of Patent: Jun. 28, 2022

(54) SYSTEMS AND METHODS FOR PROVIDING PART QUALITY CONFIDENCE

(71) Applicant: ILLINOIS TOOL WORKS INC., Glenview, IL (US)

(72) Inventors: Leland D. Falde, Jackson, MI (US); Stephen P. Ivkovich, East Lansing, MI (US); Vincent N. Romano, Pinckney, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/363,748

(22) Filed: Mar. 25, 2019

(65) Prior Publication Data

US 2020/0311853 A1    Oct. 1, 2020

(51) Int. Cl.
*G06K 9/00*    (2022.01)
*G06T 1/00*    (2006.01)
(Continued)

(52) U.S. Cl.
CPC .......... *G06T 1/0014* (2013.01); *G06K 9/6217* (2013.01); *G06K 9/6262* (2013.01);
(Continued)

(58) Field of Classification Search
CPC ... G06T 2207/10016; G06T 7/13; G06T 7/20; G06T 7/0004; G06T 2207/30164;
(Continued)

(56) References Cited

U.S. PATENT DOCUMENTS

| 4,375,026 A | 2/1983 | Kearney |
|---|---|---|
| 5,714,734 A | 2/1998 | Peterson |

(Continued)

FOREIGN PATENT DOCUMENTS

| CN | 102528227 | 7/2012 |
|---|---|---|
| CN | 102596476 | 7/2012 |

(Continued)

OTHER PUBLICATIONS

PCT, Notification of Transmittal of the International Search Report and the Written Opinion of the International Searching Authority, or the Declaration, in Application No. PCT/US2016/051585, dated Dec. 21, 2016 (12 pages).

(Continued)

*Primary Examiner* — Alex Kok S Liew
(74) *Attorney, Agent, or Firm* — McAndrews, Held & Malloy, Ltd.

(57) ABSTRACT

Systems and methods for part quality confidence are described. In some examples a part quality confidence system may receive inputs (e.g., via sensor measurements, operator input(s), etc.) related to one or more stages of a part assembly process. The inputs may be representative of certain feature characteristics of the part and/or one or more of the assembly stages. A computational engine of the system may determine one or more quality characteristics of the part based on the feature characteristics, and assign a quality metric to the part (and/or part assembly process) based on the quality characteristics. In some examples, a quality rating may be assigned to the part based on the quality metric, so as to provide an even simpler abstraction.

20 Claims, 3 Drawing Sheets

(51) Int. Cl.
*G06K 9/62* (2022.01)
*G06N 7/02* (2006.01)
*G06T 7/00* (2017.01)
*G06N 20/00* (2019.01)

(52) U.S. Cl.
CPC ............ *G06N 7/02* (2013.01); *G06T 7/0006* (2013.01); *G06N 20/00* (2019.01); *G06T 2207/20081* (2013.01); *G06T 2207/30136* (2013.01); *G06V 2201/06* (2022.01)

(58) Field of Classification Search
CPC .................. G06T 15/20; G06T 19/006; G06T 2207/30136; G06T 7/001; G06T 7/269; G06T 2207/10116; G06T 2207/30152; G06T 7/73; G06T 2207/10004; G06T 2207/10028; G06T 2207/20021; G06T 2207/20208; G06T 2207/30148; G06T 2207/30172; G06T 5/009; G06T 7/0008; G06T 7/004; B66F 9/122; B66F 9/24; G01N 21/8851; G01N 23/083; G01N 23/18; G01N 25/72; G01N 2021/8472; G01N 2021/8887; G01N 21/91; G01N 33/442
See application file for complete search history.

(56) References Cited

U.S. PATENT DOCUMENTS

| | | | |
|---|---|---|---|
| 5,756,967 | A | 5/1998 | Quinn |
| 6,484,584 | B2 | 11/2002 | Johnson et al. |
| 6,583,386 | B1 | 6/2003 | Ivkovich |
| 9,266,182 | B2 | 2/2016 | Hung |
| 9,704,140 | B2 | 7/2017 | Lamers et al. |
| 2009/0173726 | A1 | 7/2009 | Davidson et al. |
| 2012/0248081 | A1 | 10/2012 | Hutchison |
| 2014/0131320 | A1 | 5/2014 | Hearn |
| 2014/0332514 | A1 | 11/2014 | Holverson et al. |
| 2015/0069112 | A1 | 3/2015 | Abou-Nasr et al. |
| 2017/0032281 | A1* | 2/2017 | Hsu .................... G06N 5/04 |
| 2017/0072496 | A1* | 3/2017 | Falde ................. B23K 9/1062 |
| 2018/0178320 | A1 | 6/2018 | Webster |
| 2019/0160601 | A1 | 5/2019 | Daniel |
| 2019/0163172 | A1 | 5/2019 | Daniel et al. |

FOREIGN PATENT DOCUMENTS

| | | |
|---|---|---|
| CN | 102922089 A | 2/2013 |
| CN | 103331506 | 10/2013 |
| CN | 103862135 | 6/2014 |
| CN | 103909325 | 7/2014 |
| CN | 104379291 | 2/2015 |
| CN | 104551372 | 4/2015 |
| CN | 104768694 | 7/2015 |
| DE | 102009016798 A1 | 10/2010 |
| WO | 2013160745 | 10/2013 |
| WO | 2014149786 A1 | 9/2014 |

OTHER PUBLICATIONS

PCT, Notification of Transmittal of the International Search Report and the Written Opinion of the International Searching Authority, or the Declaration, in International application No. PCT/US2016/051579, dated Jan. 10, 2017 (12 pages).

Canadian Office Action Appln No. 2,996,182 dated Nov. 5, 2019 (5 pgs.).

European Patent Office, Extended Search Report, European Patent Application No. 20161414.6, dated Aug. 5, 2020, 7 pages.

* cited by examiner

SYSTEMS AND METHODS FOR PROVIDING PART QUALITY CONFIDENCE

TECHNICAL FIELD

The present disclosure generally relates to quality confidence and, more particularly, to systems and methods for providing part quality confidence.

BACKGROUND

Welded assemblies (or "parts") are sometimes of variable quality. This can be an issue, as poor quality parts can have catastrophic consequences for downstream users of the parts. Additionally, high volume part production makes manual inspection difficult. Further, even if part production was low volume, it would be difficult for manual inspection to spot less obvious imperfections, and/or identify specific causes of the imperfections, especially given the innumerable factors that may impact part quality.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for providing part quality confidence, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Figure 1:
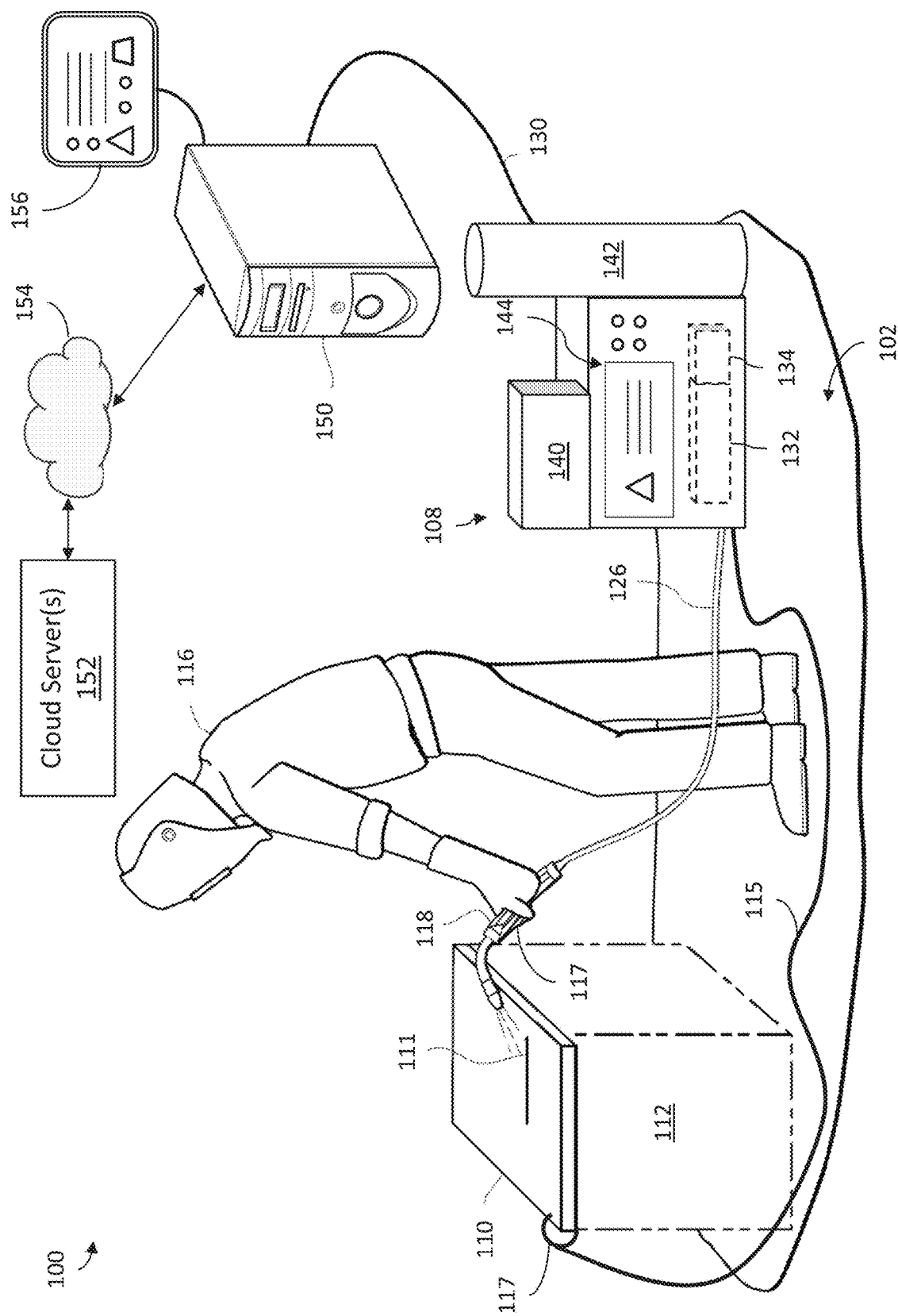
FIG. 1 shows an example welding system, in accordance with aspects of this disclosure.

Some examples of the present disclosure relate to an automated method for determining part quality, comprising capturing one or more feature characteristics relating to two or more stages of a part assembly process via a user interface or a sensor, wherein at least one of the two or more stages is a welding stage and at least one of the two or more stages is not a welding stage, determining, via a computational engine, one or more quality characteristics of a part based on the one or more feature characteristics, and assigning, via the computational engine, a quality metric to the part based on the one or more quality characteristics.

In some examples, the one or more feature characteristics comprise one or more assembly process characteristics, part specific characteristics, weld specific characteristics, or workflow specific characteristics. In some examples, the one or more assembly process characteristics comprise one or more of a shift start time, a shift end time, a unique operator identifier, an operator name, an operator qualification, material preparation information, a material type, a gas type, an assembly location, an ambient temperature, or an ambient humidity. In some examples, the one or more part specific characteristics comprise one or more of a part assembly start time, a part assembly end time, a number of expected welds, a number of completed welds, a number of false arcs, a number of ignored welds, a number of extra welds, a number of missing welds, a number of pre-part welds, a number of post-part welds, a time interval between successive welds, a clamp time, a cycle time, a time interval between welding events, a previous event type, a total deposited filler amount, a total arc time, a total gas amount used, a part property measurement, or part inspection data. In some examples, the one or more weld specific characteristics comprise a weld start time, a weld end time, a weld duration, a weld type, a weld identifier, a weld class, a weld procedure, an operator identifier, a weld pass number, a weld confidence metric, a weld quality metric, a deposited filler amount, a voltage, a current, a wire feed speed, a gas flow, or a torch travel speed, a torch travel angle, a work angle, weld coordinates, a weld temperature, a weld property measurement, or weld inspection data. In some examples, the one or more workflow specific characteristics comprise a workflow event identifier, a workflow instruction identifier, a workflow event date or time, a workflow instruction date or time, a workflow event detail, or a workflow instruction detail.

In some examples, the computational engine comprises one or more of a rule based engine, an equation based engine, a fuzzy logic engine, or a machine learning engine, and the computational engine operates within a welding power supply, a personal computer, or a network server. In some examples, the method further comprises determining one or more corrective recommendations based on the one or more quality characteristics, and displaying, via a display screen, the quality metric or one or more corrective recommendations. In some examples, the method further comprises executing one or more corrective actions based on the one or more corrective recommendations. In some examples, the quality metric comprises a first quality metric, the part comprises a first part, and the method further comprises determining a quality comparison between the first part and a second part based on the first quality metric and a second quality metric, determining one or more corrective recommendations based on the quality comparison, and executing one or more corrective actions based on the one or more corrective recommendations.

Some examples of the present disclosure relate to a system for determining part quality, comprising processing circuitry, and a computer readable storage device comprising computer readable instructions which, when executed, cause the processing circuitry to capture one or more feature characteristics relating to two or more stages of a part assembly process via a user interface or a sensor, wherein at least one of the two or more stages is a welding stage and at least one of the two or more stages is not a welding stage, determine one or more quality characteristics of a part based on the one or more feature characteristics; and assign a quality metric to the part based on the one or more quality characteristics.

In some examples, the quality metric is additionally assigned based on one or more weights applied to the one or more quality characteristics. In some examples, the one or more quality characteristics comprise one or more assembly process characteristics, part specific characteristics, weld specific characteristics, or workflow specific characteristics. In some examples, a computational engine is used to determine the one or more quality characteristics, or assign or the quality metric, wherein the computational engine comprises one or more of a rule based engine, an equation based engine, a fuzzy logic engine, or a machine learning engine. In some examples, the computer readable storage device comprises computer readable instructions which, when executed, further cause the processing circuitry to determine a color, label, or grade indicative of the overall quality of the part based on the quality metric. In some examples, the quality metric comprises a number between 0 and 100. In some examples, the computer readable storage device comprises computer readable instructions which, when executed, further cause the processing circuitry to determine one or more corrective recommendations based on the one or more quality characteristics. In some examples, the system further comprises a display configured to display the quality metric or the one or more corrective recommendations. In some examples, the computer readable storage device comprises computer readable instructions which, when executed, further cause the processing circuitry to execute one or more corrective actions based on the one or more corrective recommendations. In some examples, the quality metric comprises a first quality metric, the part comprises a first part, and the computer readable storage device comprises computer readable instructions which, when executed, further cause the processing circuitry to determine a quality comparison between the first part and a second part based on the first quality metric and a second quality metric, determine one or more corrective recommendations based on the quality comparison, and execute one or more corrective actions based on the corrective recommendations.

Some examples of the present disclosure relate to systems and methods for providing part quality confidence. In some examples, a welded assembly (or "part") is produced from one or more workpieces via an assembly process. The assembly process may have one or more pre-welding stages (e.g., preparation stages), one or more welding stages, and/or one or more post-welding stages (e.g., finishing stages).

A part quality confidence system may receive inputs (e.g., via sensor measurements, operator input(s), etc.) related to one or more stages of the part assembly process. The inputs may be representative of certain feature characteristics of the part and/or one or more of the part assembly stages. A computational engine of the system may determine one or more quality characteristics of the part based on the feature characteristics, and assign a quality metric to the part (and/or part assembly process) based on the quality characteristics. In some examples, the quality metric may be a number (e.g., 0-100). In some examples, a quality rating may be assigned to the part based on the quality metric, so as to provide an even simpler abstraction. In some examples, the quality rating may be, for example, a color (e.g., red, green, yellow), a sound (a chime, a bell, a buzzer, a horn), a label (e.g., very good, good, mediocre, marginal, questionable, bad, very bad), and/or some other summary of the quality metric.

The system provides a means to evaluate a significant number of characteristics that may impact the quality of a part (and/or part assembly process). The part quality metric/rating provided by the part quality control system allows an individual to quickly judge the quality of a part or part assembly process.

FIG. 1 shows an example of a welding system 100. As shown, the welding system 100 includes a welding torch 118 and work clamp 117 coupled to a welding-type power supply 108 within a welding cell 102, and a computing system 150 in communication with the welding-type power supply 108. In some examples, the computing system 150 may also be in communication with the welding torch 118 (e.g., via the welding-type power supply 108).

In the example of FIG. 1, an operator 116 is handling the welding torch 118 near a welding bench 112. In some examples, the welding bench 112 may be and/or include a fixturing system configured to hold one or more workpiece(s) 110. In some examples the fixturing system may include one or more work clamps 117 (e.g., manual and/or pneumatic clamps). While a human operator 116 is shown in FIG. 1, in some examples, the operator 116 may be a robot and/or automated welding machine.

In the example of FIG. 1, the welding torch 118 is a gun configured for gas metal arc welding (GMAW). In some examples, the welding torch 118 may comprise an electrode holder (i.e., stinger) configured for shielded metal arc welding (SMAW). In some examples, the welding torch 118 may comprise a torch and/or filler rod configured for gas tungsten arc welding (GTAW). In some examples, the welding torch 118 may comprise a gun configured for flux-cored arc welding (FCAW). In some examples, the welding torch 118 may additionally, or alternatively, comprise a filler rod. In the example of FIG. 1, the welding torch 118 includes a trigger 119. In some examples, the trigger 119 may be activated by the operator 116 to trigger a welding-type operation (e.g., arc).

In the example of FIG. 1, the welding torch 118 is coupled to the welding-type power supply 108 via a welding cable 126. A clamp 117 is also coupled to the welding-type power supply 108 via a clamp cable 115. The welding-type power supply 108 is, in turn, in communication with computing system 150, such as via conduit 130. In some examples, the welding-type power supply 108 may alternatively, or additionally, include wireless communication capabilities, through which connection may be established with computing system 150.

In the example of FIG. 1, the welding-type power supply 108 includes power conversion circuitry 132 configured to receive input power (e.g., from mains power, a generator, etc.) and convert the input power to welding-type power. As shown, the welding-type power supply 108 further includes control circuitry 134 configured to control the power conversion circuitry 132. In some examples, the control circuitry 134 may include processing circuitry (and/or one or more processors) as well as analog and/or digital memory. In some examples, the welding-type power supply 108 outputs welding-type power to the welding torch 118 via the welding cable 126.

In the example of FIG. 1, the welding-type power supply 108 includes (and/or is coupled to) a wire feeder 140 and gas supply 142. In some examples, the wire feeder 140 may house a wire spool and/or filler spool that is used to provide the welding torch 118 with welding material (e.g., metal, tungsten, etc.). In some examples, the gas supply 142 may contain gas that may be supplied to the welding torch 118 to help shield (and/or otherwise facilitate) the welding.

In some examples, the welding-type power supply 108 may control output of wire and/or gas from the wire feeder 140 and/or gas supply 142. For example, control circuitry 134 within the welding-type power supply 108 may control a motor of the wire feeder 140 and/or a valve in communication with the gas supply 142 to regulate wire and/or gas delivered to the welding torch 118. In some examples, wire and/or gas from the wire feeder 140 and/or gas supply 142 may be delivered to the welding torch 118 through the welding cable 126. In some examples, when the operator 116 activates a trigger 119 of the welding torch 118, the welding torch 118 may use the welding-type power provided by the welding-type power supply 108 (and/or the welding wire and/or gas provided by the wire feeder 140 and/or gas supply 142) to apply a welding arc to one or more workpieces 110. The arc may provide a means through which droplets of welding material may be used to form one or more welds 111 on one or more workpieces 110. In some examples, the work clamp 117 attached to the workpiece(s) 110 (and/or bench 112) may provide a return path for the arc current.

In the example of FIG. 1, the welding-type power supply 108 also includes an operator interface 144. The operator interface 144 comprises one or more adjustable inputs (e.g., knobs, buttons, switches, keys, etc.) and/or outputs (e.g., display screens, lights, speakers, etc.). In some examples, the operator 116 may use the operator interface 144 to enter and/or select one or more weld settings (e.g., voltage, current, gas type, wire feed speed, workpiece material type, filler type, etc.) for the welding-type power supply 108. In some examples, the weld settings may be stored in a memory of the control circuitry 134 and/or in some external memory. The welding-type power supply 108 may then control (e.g., via control circuitry 134) its operation according to the weld settings. In the example of FIG. 1, the operator interface 144 may further include one or more receptacles configured for connection to (and/or reception of) one or more external memory devices (e.g., floppy disks, compact discs, digital video disc, flash drive, etc.).

In some examples, the welding-type power supply 108 may communicate with computing system 150 through conduit 130 and/or a (e.g., wireless) communication device. In some examples, the welding-type power supply 108 may communicate with one or more cloud servers 152 through the computing system 150. In some examples, the computing system 150 may be a personal computer, such as a desktop or laptop, for example. In some examples, the computing system 150 may be a mobile device, such as, for example, a smartphone, personal digital assistant, portable music player, and/or tablet computer. In some examples, the computing system 150 may be implemented via the welding-type power supply 108 (e.g., via the control circuitry 134 of the welding-type power supply 108). In some examples, the welding torch 118 may additionally, or alternatively, be in direct communication with the computing system 150.

In the example of FIG. 1, the computing system 150 is in communication with one or more cloud servers 152 through a network 154 (e.g., a local area network (LAN), a wide area network (WAN), the internet, etc.). In some examples, the computing system 150 may be in communication with other computing systems through the network 154 as well. In some examples, the welding-type power supply 108 may additionally, or alternatively, be in communication with the one or more cloud servers 152 (and/or other computing systems) through the network 154. In some examples, the computing system 150 (and/or welding-type power supply 108) may include communication circuitry to facilitate communication. In some examples, the computing system 150 may communicate via one or more wired media and/or protocols (e.g., Ethernet cable(s), universal serial bus cable(s), etc) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In the example of FIG. 1, the computing system 150 is in electrical communication with a user interface 156. As shown, the user interface 106 comprises a touch screen interface, such as a tablet, touch screen computer, smartphone or other touch screen device. In some examples, the user interface 106 may additionally, or alternatively, comprise other input devices (e.g., mouse, keyboard, buttons, knobs, microphones, etc.) and/or output devices (e.g., display screen, speakers, etc.). In some examples, the user interface 106 may further include one or more receptacles configured for connection to (and/or reception of) one or more external memory devices (e.g., floppy disks, compact discs, digital video disc, flash drive, etc.). In operation, an operator or other user may provide input to, and/or receive output from, the computing system 150 (and/or cloud server (s) 152 through computing system 150) via the user interface 156.

In some examples, the computing system 150 may be configured to detect certain events (e.g., workflow events), and/or provide certain instructions (e.g., workflow instructions), such as in response to the events. In some examples, workflow instructions may be pre-specified operations that are desired to occur when specific events happen. For example, the computing system 150 may be in communication with a sensor that reads some information indicative of a certain event (e.g., wire spool change, loading of workpiece 110), and then execute certain instructions (e.g., display schematics, issue alert, etc.) in view of that event. In some examples, workflow instructions may include, for example, one or more of the following: send email and/or text information to a supervisor, play a video, sound an alarm, shutdown the welding machine (e.g., power supply 108), disable the welding torch 118, etc.

Figure 2:
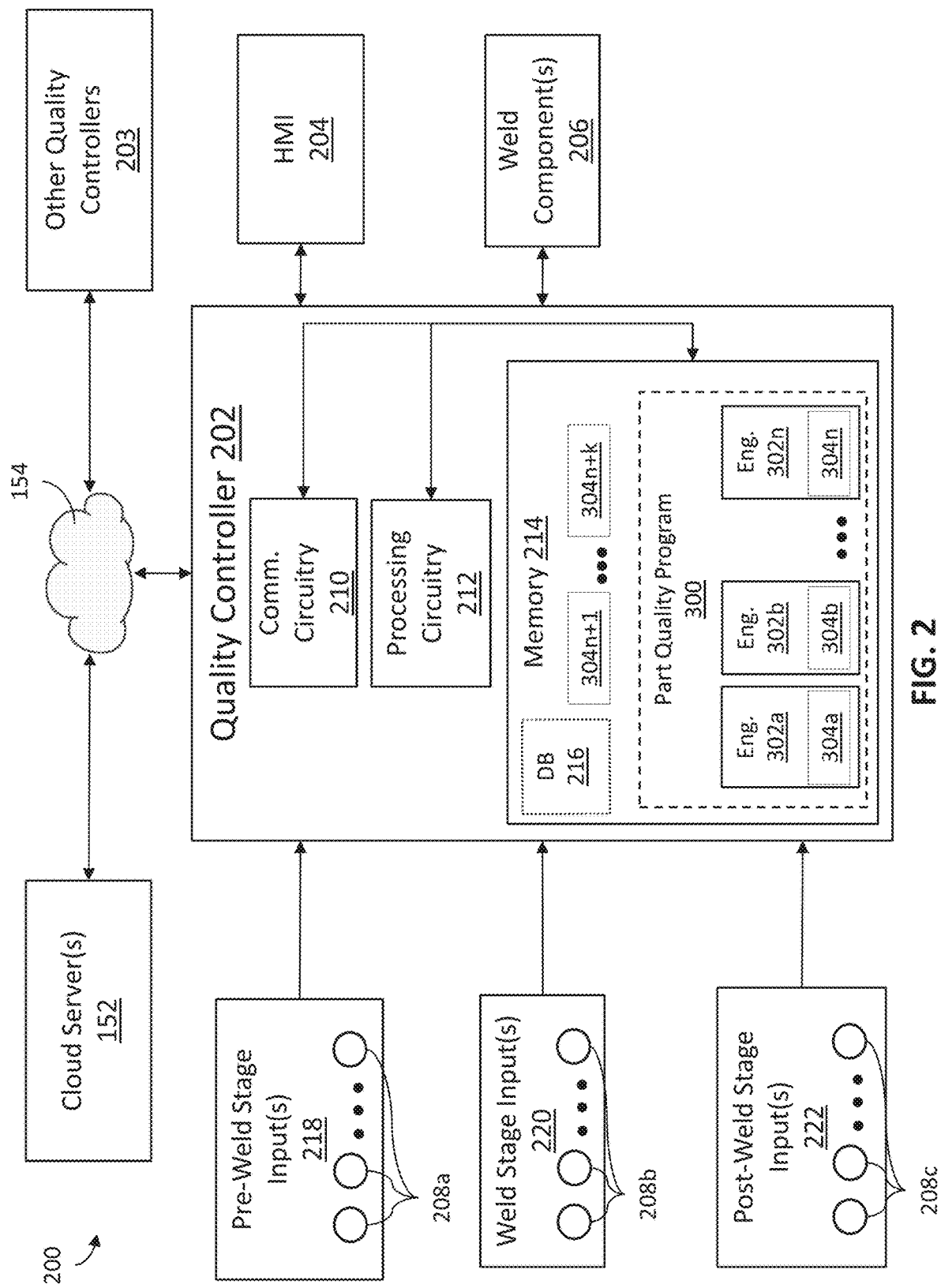
FIG. 2 is a block diagram illustrating an example part confidence welding system, in accordance with aspects of this disclosure.

FIG. 2 shows an example of a quality assurance system 200. As shown, the quality assurance system 200 includes a quality controller 202 in electrical communication with a human machine interface (HMI) 204, one or more weld components 206, and several sensors 208. As shown, the quality controller 202 is further in electrical communication with one or more cloud servers 152 and one or more other quality controllers 203 via a network 154. In some examples, the HMI 204 may be implemented via the user interface 156 and/or operator interface 144. In some examples, the one or more weld components 206 may comprise one or more of the welding torch 118, welding-type power supply 108 (e.g., power conversion circuitry 132 and/or control circuitry 134), wire feeder 140, gas supply 142, clamp 117, a foot pedal (not shown), and/or other appropriate welding components.

In some examples, some or all of the quality controller 202 may be implemented as part of the welding-type power supply 108 (e.g., via control circuitry 134), computing system 150, and/or cloud server(s) 152. As shown, the quality controller 202 includes communication circuitry 210, processing circuitry 212, and memory 214 in electrical communication with one another via an electrical bus. In some examples, the processing circuitry 212 may comprise one or more processors. In some examples, the communication circuitry 210 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 210 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In the example of FIG. 2, the memory 214 stores a database 216 and a part quality program 300. In some examples, the database 216 is structured to store and/or organize input data related to the part quality program 300. In some examples, some or all of the database 216 may be stored on one or more of the cloud servers 152.

In the example of FIG. 2, the part quality program 300 includes several computational engines 302, though, in some examples, only one computational engine 302 may be used. As shown, the part quality program 300 is also composed of several modules 304 that may be individually or collectively be replaced, updated, and/or modified without having to replace, update, and/or modify the entire part quality program 300. In the example of FIG. 2, each computational engine 302 includes a module 304. In some examples, each computational engine 302 may be comprised of several modules 304, or no modules. In some examples, the module(s) 304 may comprise part or all of the computational engines 302.

In some examples, the part quality program 300 is configured to produce a simple, easily understood, quality metric and/or quality rating, so as to allow a user to understand at a glance the quality of a particular part or part assembly process. In some examples, the computational engine 302 is configured to operate on input data to generate this quality metric and/or quality rating. In some examples, the input data and/or quality metrics for several parts may be amalgamated, combined, and/or collectively analyzed to generate a quality metric for the assembly process that produced the parts. The part quality program 300 may further facilitate comparison of input data and/or quality metrics between different parts and/or part assembly processes to better understand potential causes, correlations, and/or corrective measures that may be taken.

In some examples, a part assembly process may include one or more pre-weld stages, weld stages, and/or post-weld stages. For example, during a pre-weld (e.g., preparation) stage, an operator (and/or other individual) may log in (e.g., to computing system 150, cloud server(s) 152, and/or welding-type power supply 108), review alerts, acknowledge the review, watch videos (e.g., operational, training, and/or other videos), acknowledge watching videos, perform a setup operation (e.g., of or on a welding-type power supply 108, cloud server 152, and/or computing system 150), receive a job assignment, load the job (e.g., on the welding-type power supply 108, cloud server 152, and/or computing system 150), receive welding material, read a barcode or tag (e.g., NFC, RFID, Bluetooth, Zigbee Rubee, etc.) of the welding material, get a fixture (e.g., clamp 117), read a barcode or tag of the clamp 117, obtain one or more consumables (e.g., filler wire spool), read a barcode or tag of the consumables, obtain a torch tip, read a barcode or tag of the torch tip, perform a pre-heating operation, perform a grinding operation, perform a pre-weld inspection of the workpiece(s) 110 (e.g., visually or otherwise), perform a scheduled and/or workflow directed maintenance activity, clean and/or otherwise prepare the workpiece(s) 110, welding torch 118, welding bench 112, and/or clamp 117, load workpiece(s) 110 onto welding bench 112, clamp workpiece(s) 110 to welding bench 112, identify and/or acknowledge the loading and/or clamping, position the workpiece 110 and/or clamp 117, identify and/or acknowl-edge the positioning, mark and/or tag the workpiece(s) 110, and/or other perform other appropriate pre-welding operations. During a welding stage, an operator (and/or other individual) may, for example, clamp the workpiece 110 to the bench 112, identify and/or acknowledge the clamping, position the workpiece 110 and/or clamp 117, identify and/or acknowledge the positioning, select to begin a welding operation (e.g., on the welding-type power supply 108, cloud server 152, and/or computing system 150), perform one or more welds (e.g., tacking welds, root pass welds, cap pass welds, etc.), reposition the workpiece 110 and/or clamp 117, identify and/or acknowledge the repositioning, unclamp the workpiece 110, identify and/or acknowledge the unclamping, inspect the workpiece(s) 110, welding cell 102, welding torch 118 (e.g., torch tip), (e.g., as directed by workflow instructions), clean the workpiece(s) 110 and/or welding torch 118 (e.g., as directed by workflow instructions), perform other maintenance (e.g., tip change, liner check/clean/change, etc.), and/or perform other appropriate welding operations. During a post-welding stage, an operator (and/or other individual) may, for example, inspect the part, answer questions relating to the part (e.g., via the operator interface 144, user interface 156, and/or HMI 204), take pictures of the part, record measurements of the part, polish the part, label the part (e.g., with barcode, RFID tag, stamp, etc.), and/or perform other appropriate post welding operations.

In the example of FIG. 2, one or more pre-weld stage inputs 218, weld stage inputs 220, and/or post-weld stage inputs 222 are obtained and routed to the quality controller 202. While only one pre-weld stage, weld stage, and post-weld stage is shown in FIG. 2, in some examples there may be several pre-weld stages, weld stages, and/or post-weld stages, with one or more inputs captured and routed to the quality controller 202 from each stage. In some examples, the pre-weld stage inputs 218, weld stage inputs 220, and/or post-weld stage inputs 222 may comprise input data obtained through data collected by or through the sensors 208, as well as information collected by or through the operator interface 144 and/or user interface 156. In some examples, the pre-weld stage inputs 218 and/or post-weld stage inputs 222 may comprise input data obtained during an intermediate non-welding stage that occurs between welding stages.

In some examples, the sensors 208 of the quality assurance system 200 may track and/or record (and/or take measurements relating to) the operator 116, workpiece 110, welding-type power supply 108, computing system 150, and/or other individuals and/or components relevant to quality assurance during the pre-weld, weld, and/or post weld stage(s). In some examples, the sensors 208 may include one or more current sensors, voltage sensors, resistance sensors, wire feed sensors, gas flow sensors, clamping sensors, interrogators (e.g. near field communication (NFC) interrogators, or radio frequency ID (RFID) interrogators, Bluetooth interrogators, etc.), barcode readers, cameras, optical sensors, infrared sensors, acoustic sensors, position sensors, accelerometers, inertial measurement units (IMUs), x-ray sensors, radiographic sensors, torque sensors, non-destructive testing sensors, temperature sensors, humidity sensors, and/or other appropriate sensors. In some examples, data obtained by the sensors 208 may be encoded into one or more electrical signals and sent to (and/or input into) the quality controller 202.

In some examples, the data obtained from the sensors 208 may itself comprise, and/or may be used to derive, one or more feature characteristics of the part and/or part assembly process. In some examples, the feature characteristics may be used by the part quality program 300 to determine certain quality characteristics, from which may be derived one or more quality metrics and/or quality ratings. In some examples, the feature characteristics may be categorized as assembly process characteristics, part specific characteristics, weld specific characteristics, and/or workflow specific characteristics.

Assembly process characteristics may include, for example, start/end times of one or more shifts, unique operator identifiers, operator names, operator qualifications (e.g., credentials, degrees, experience types and/or times, certificates, etc.), material preparation information, material types, gas types, assembly locations, ambient temperatures, ambient humidity, and/or other assembly process specific characteristics.

Part specific characteristics may be, for example, properties, attributes, and/or other information pertaining to the particular part being produced during the part assembly process. Part specific characteristics may include, for example, part assembly start times, part assembly end times, a number of expected welds, a number of completed welds, a number of false arcs, a number of ignored welds, a number of extra welds, a number of missing welds, a number of pre-part welds, a number of post-part welds, time intervals between successive welds, clamp times, cycle times, time intervals between welding activities, previous event types, previous activity types, total deposited filler amount, total arc time, total gas amount used, pre-heat temperatures, non-destructive testing information, part property measurements, and/or part inspection information.

Weld specific characteristics may be, for example, properties, attributes, and/or other information pertaining to one or more welds performed during the weld stage of the part assembly process. Weld specific characteristics may include, for example, weld start times, weld end times, weld durations, weld types, weld identifiers, weld classes, weld procedures, operator identifiers, weld pass numbers, weld confidence metrics (e.g., such as described in U.S. patent application Ser. No. 15/264,013, filed Sep. 13, 2016, and entitled "Systems and Methods for Providing Weld Quality Confidence," incorporated herein by reference in its entirety), weld quality metrics (e.g., assigned by system and/or operator), a deposited filler amount, (e.g., average) voltages, (e.g., average) currents, (e.g., average) wire feed speeds, (e.g., average and/or total) gas flows, (e.g., average) torch travel speeds, (e.g., average) torch travel angles, (e.g., average) work angles, weld coordinates (e.g., start, end, intermediate), (e.g., average) weld temperatures, non-destructive testing information, weld property measurements, and/or weld inspection data.

Workflow specific characteristics may be, for example, properties, attributes, and/or other information pertaining to one or more workflow events and/or instructions. Workflow specific characteristics may include, for example, workflow event identifiers, workflow instruction identifiers, workflow event dates and/or times, workflow instruction dates and/or times, workflow event details (e.g., response to question or prompt, amount of torque applied, etc.), and/or workflow instruction details (e.g., prompt delivered to operator, means of delivery, whether acknowledgement received, response to prompt).

In some examples, the computational engine 302 of the part quality program 300 may be configured to receive and/or derive feature characteristics based on information received from the sensors 208 and/or from the operator 116 (e.g., via operator interface 144, user interface 156, and/or other appropriate means). For example, the computational engine 302 may receive direct input indicating when a weld starts and stops, and from that information derive the duration. In some examples, the computational engine 302 may analyze the feature characteristics to calculate, derive, and/or determine certain quality characteristics. For example, the computational engine 302 may determine a particular quality characteristic based on whether the start and end production times of a given part are between the start and times of a given shift, and the quality metric for that part may be positively or negatively impacted according to the determination. The computational engine 302 may analyze one or more quality characteristics, and assign a quality metric (and/or quality rating) based on the analysis.

In some examples, each quality characteristic may be a number between 0 and 100, and the computational engine(s) 302 may average the quality characteristics to obtain an overall quality metric that is a number between 0 and 100. In some examples, the quality metric may start at a certain number (e.g., 0, 50, or 100), and each quality characteristic may have impact the quality metric in some way (e.g., add 10, subtract 20, multiply by two, divide by three, etc.). In some examples, the computational engine(s) 302 may apply one or more weights to some or all of the quality characteristics, so as to emphasize the importance of some and/or deemphasize the importance of others. In some examples, the one or more weights may be implemented via one or more modules 304, such that the weights may be easily updated (e.g., by updating the modules 304). In some examples, multiple computational engines 302 may be used, with one computational engine 302a using one method to determine a first quality metric, and another computational engine 302b using another method to determine a second quality metric. In some examples, still another computational engine 302n may determine an overall quality metric based on the first and second quality metrics.

In some examples, one or more of the computational engines 302 may be an equation based engine, a rules based engine, a fuzzy logic engine, and/or a machine learning engine. In some examples, an equation based engine may be configured to evaluate the feature characteristics and/or quality characteristics using certain equations. The equations may be developed, for example, based on various expert knowledge and/or best practices. An example of an equation may be, for example, (quality characteristic) QC1=100−(Number_of_missing_welds×30) (where QC must be at least 0). Another example of an equation might be, for example, (quality metric) QM=W1*QC1+W2*QC2+W3*QC3+ . . . +W4*QCn, where W1+W2+W3+ . . . +Wn=1. In some examples, one or more modules 304 may be used to implement one or more of the equations, such that the equations may be easily updated (e.g., by updating the modules 304) upon new and/or changed expert knowledge and/or best practices.

In some examples, one or more of the computational engines 302 may be a rules based engine. In some examples, a rules based engine may be configured to evaluate the feature characteristics and/or quality characteristics using certain rules. The rules may be developed, for example, based on various expert knowledge and/or best practices. An example of a rule might be that operators who work with certain materials and/or consumables must have certain qualifications and/or credentials in order for a quality metric of the part to be a certain level (e.g., >75). Another example of a rule might be that if the number of completed welds is less than the number of expected welds, then the part confidence must be less than a certain level (e.g., <25). In some examples, the rule based engine may be implemented in code using a series of if/else statements or the like. In some examples, each "if" may be associated with one or more reasons, and the reasons for each true "if" may be collected and/or presented as reasons for the quality metric. In some examples, one or more modules 304 may be used to implement one or more of the rules, such that the rules may be easily updated (e.g., by updating the modules 304) upon new and/or changed expert knowledge and/or best practices.

In some examples, one or more of the computational engines 302 may be a fuzzy logic engine. In some examples, a fuzz logic engine may be have elements of a rule based engine, and yet be configured to recognize, interpret, and/or analyze data that is neither entirely one thing or another (e.g., neither true, nor false, but somewhere in between, like a partial truth). For example, the fuzzy logic engine may recognize that materials are sometimes of mixed composition, and/or requirements for certain qualifications may be partially completed. The fuzzy logic engine may implement certain algorithms and/or functions to "fuzzify" the feature characteristics and/or quality characteristics. In some examples, one or more modules 304 may be used to implement one or more of the fuzzifying algorithms/functions (and/or one or more rules), such that they may be easily updated (e.g., by updating the modules 304).

In some examples, one or more of the computational engines 302 may be a machine learning engine. In some examples, a machine learning engine may operate on (and/or learn from) collections of data (e.g., in database 216) to identify patterns and/or develop its own model what makes for a quality part and/or assembly process. In some examples, the machine learning engine may use one or more clustering algorithms to sort and/or cluster related parts into categories. In some examples, data associated with known faulty (e.g., low quality) parts or part assembly processes and/or known good (e.g., high quality) parts or part assembly processes may be used to identify patterns in new data, classify new parts and/or part assembly processes, and/or estimate quality. In some examples, classification algorithms may be used to classify parts as good or bad and generate part confidence estimates related to distance metrics—particularly in K nearest neighbor methods. In some examples, the machine learning engine(s) may additionally, or alternatively, analyze the (e.g., historic and/or instant) quality characteristics, quality metrics, and/or implementations of other computational engines 302 (e.g., using regression algorithms) to evaluate the quality of a part and/or process.

Figure 3:
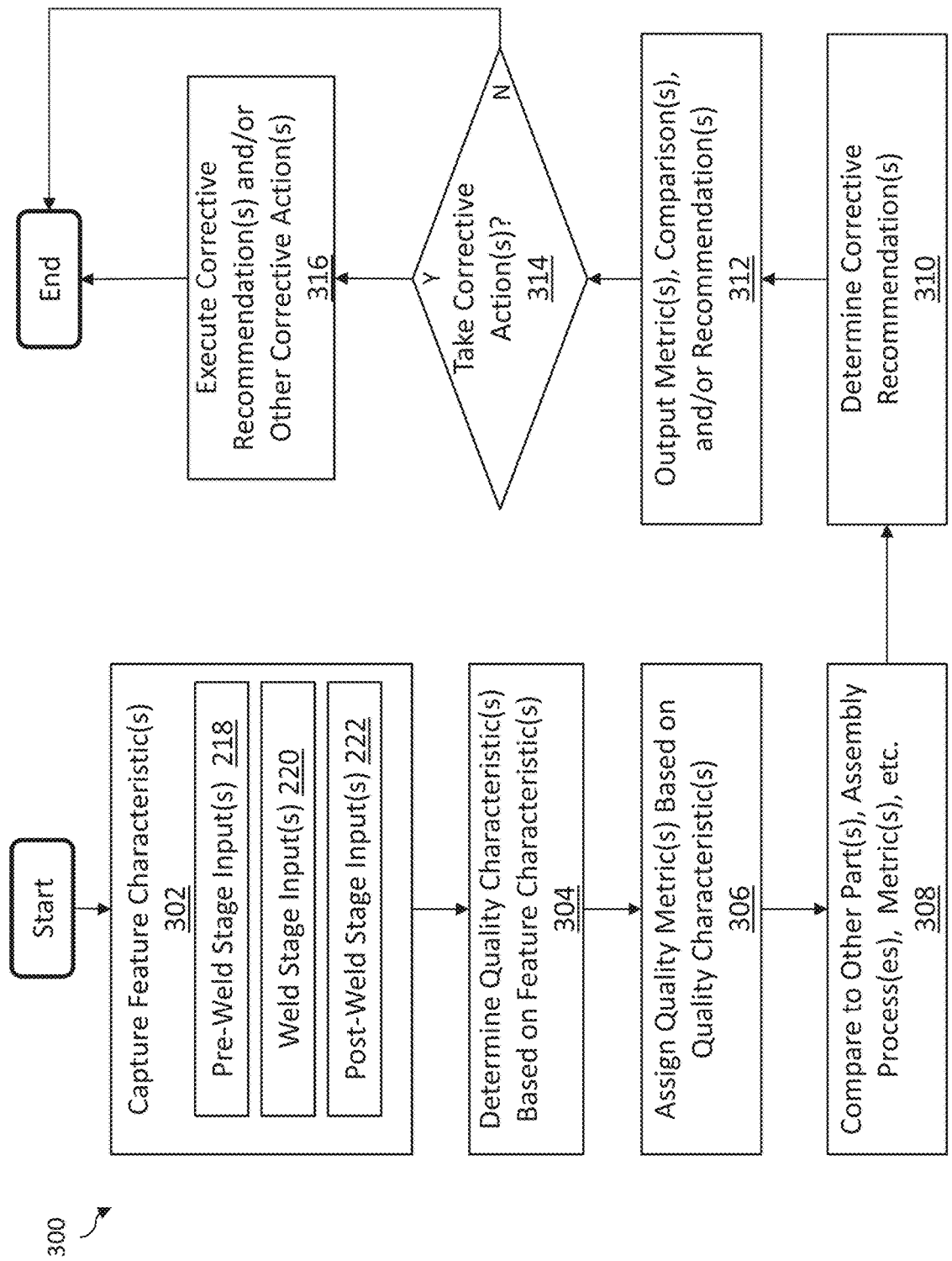
FIG. 3 is a flowchart illustrating an example part confidence process, in accordance with aspects of this disclosure.

FIG. 3 is a flowchart illustrating an example part quality program 300. In some examples, the part quality program 300 may be implemented in machine readable instructions stored in memory 214 and/or executed by the processing circuitry 212 of the quality controller 202. In some examples, some or all of the part quality program 300 may be performed by one or more computing engines 302 of the part quality program 300.

In the example of FIG. 3, the part quality program 300 begins at block 302, where feature characteristics are captured during stages of a part assembly process. As shown, the feature characteristics may comprise and/or be derived from one or more pre-weld stage inputs 218 (e.g., from one or more pre-weld stages), one or more weld stage inputs 220 (e.g., from one or more weld stages), and/or one or more post-weld stage inputs 220 (e.g., from one or more post-weld stages). After block 302, the part quality program 300 proceeds to block 304, where one or more quality characteristics are determined based on the feature characteristic(s).

At block 306, the one or more quality characteristics are evaluated and one or more quality metrics are assigned to the part. In some examples, the quality metric(s) may be a number (e.g., 0-100). In some examples, one or more quality ratings may be assigned to the part based on the quality metric(s). The quality rating(s) may be simplified abstractions of the quality metric(s), such as, for example, a color (e.g., red, green, yellow), a sound (a chime, a bell, a buzzer, a horn), a label (e.g., very good, good, mediocre, marginal, questionable, bad, very bad), and/or some other summary of the quality metric.

In the example of FIG. 3, the part quality program 300 proceeds to block 308 after block 306. At block 308, the part quality program 300 may compare the feature characteristic(s), quality characteristic(s), quality metric(s), and/or quality rating(s) of the part to feature characteristic(s), quality characteristic(s), quality metric(s), and/or quality rating(s) of one or more other parts. In some examples, the comparison(s) may be done with respect to time, to illuminate historical trends and/or changes. In some examples, this comparison may be done in response to some user input (e.g., via the HMI 204). In some examples, the result(s) of the comparison may be output to the user (e.g., via a display and/or other output mechanism of the HMI 204) so that the user can get a sense of how and/or why the feature characteristic(s), quality characteristic(s), quality metric(s), and/or quality rating(s) differ. In some examples, the part quality program 300 may determine, estimate, and/or offer possible reasons for the differences (e.g., based on reasons associated with various rules, equations, and/or machine learning algorithms of the computing engine(s) 302). In some examples, the part quality program 300 may compare and/or combine the feature characteristic(s), quality characteristic(s), quality metric(s), and/or quality rating(s) of one or more other parts of the same part assembly process to generate one or more quality metrics and/or quality ratings of the part assembly process as a whole. In some examples, the quality metrics and/or quality ratings of the part assembly process may additionally, or alternatively, include a production quantity metric/rating and/or production speed metric/rating. In some examples, the one or more quality metrics and/or quality ratings of the part assembly process (and/or the amalgamated feature characteristic(s), quality characteristic(s), quality metric(s), and/or quality rating(s)) may be compared to those of other part assembly processes, and the result(s) of the comparison may be output (along with potential reasons for differences) to the HMI 204.

In the example of FIG. 3, the part quality program 300 proceeds to block 310 after block 308. At block 310, the part quality program 300 determines one or more corrective recommendations for the part and/or part assembly process. In some examples, one or more corrective recommendations may be generated by the part quality program if and/or when one or more of the quality metrics (and/or one or more of the quality ratings) are below one or more (e.g., predetermined, programmatically determined, and/or user set) thresholds. Threshold values may be stored in memory 214 and/or at cloud server 152, for example, and/or be informed by a particular welding process, material type, and/or other associated characteristic. In some examples, the corrective recommendations may be based on prior comparisons, identified reasons, historical data, and/or related data (e.g., associated with similar parts and/or part assembly processes). In some examples, the type and/or number of corrective recommendations may be based on one or more identified feature characteristics and/or quality characteristics that negatively (and/or positively) impacted the quality metric(s), informed by the one or more thresholds.

In some examples, the corrective recommendation(s) may include one or more corrective actions that may be taken and/or implemented. For example, the corrective action(s) may include a change to one or more of the feature characteristics, one or more settings of the welding-type power supply 108, workflow, torch 118, and/or other actions that may be taken during the pre-weld, weld, and/or post-weld stages. Corrective actions can include such operations as, for example, one or more of the following: lock the part clamping mechanism without automatically releasing a part until the part has been inspected; disable the manual welding torch until a supervisor resets the system; and/or automatically move the part into a scrap bin. Corrective action can be done as an intrinsic part of the normal operation of the software and hardware of the system, or it can be caused by the execution of a specific workflow instruction that has been added to uniquely provide a desired form of corrective action.

In the example of FIG. 3, the part quality program 300 proceeds to block 312 after block 310. At block 312, the part quality program 300 outputs (e.g., via the HMI 204) the quality metric(s), quality rating(s), comparison(s), reason(s), and/or recommendation(s). In some examples, block 312 may be executed earlier or later in the process. In some examples, the feature characteristic(s) and/or quality characteristic(s) may also be output. Afterwards, at block 314, the user is prompted to decide whether to implement one or more of the recommended corrective actions, or other corrective actions. If the user decides not to implement any corrective action, then the part quality program 300 ends. If the user does decide to implement one or more corrective actions, those actions are executed at block 316. In some examples, the quality controller 202 may communicate with the welding components 206 and/or computing system 150 to execute the one or more corrective actions.

The part quality control system 200 provides a means to evaluate a significant number of characteristics that may impact the quality of a part (and/or part assembly process), and provide a simple quality metric/rating. The part quality metric/rating provided by the part quality control system 200 allows an individual to quickly judge the quality of a part or part assembly process.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor 130.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

What is claimed is:

1. An automated method for determining part quality, comprising:
    capturing, via a user interface or a sensor, one or more feature characteristics relating to a part assembly process for a part, the part assembly process or the part comprising two or more workpieces, and the one or more feature characteristics comprising one or more part specific characteristics,
    the one or more part specific characteristics comprising a number of expected welds, a number of completed welds, a number of false arcs, a number of extra welds, a time interval between successive welds, a clamp time a total deposited filler amount, or a total gas amount used;
    determining, via a computational engine, one or more quality characteristics of the part based on the one or more feature characteristics; and
    assigning, via the computational engine, a quality metric to the part based on the one or more quality characteristics.

2. The method of claim 1, wherein the one or more feature characteristics further comprise one or more assembly process characteristics weld specific characteristics, or workflow specific characteristics.

3. The method of claim 2, wherein the one or more feature characteristics further comprise the one or more assembly process characteristics, wherein the one or more assembly process characteristics comprise one or more of a shift start time, a shift end time, a unique operator identifier, an operator name, an operator qualification, material preparation information, a material type, a gas type, an assembly location, an ambient temperature, or an ambient humidity.

4. The method of claim 1, wherein the part is formed during the part assembly process by assembling together the two or more workpieces via two or more welds.

5. The method of claim 2, wherein the one or more feature characteristics further comprise the one or more weld specific characteristics, wherein the one or more weld specific characteristics comprise a weld type, a weld identifier, a weld class, a weld procedure, an operator identifier, a weld pass number, a weld confidence metric, a weld quality metric, a deposited filler amount, a wire feed speed, a gas flow, a torch travel speed, a torch travel angle, a work angle, weld coordinates, a weld temperature, or a weld property measurement.

6. The method of claim 2, wherein the one or more feature characteristics further comprise the one or more workflow specific characteristics, wherein the one or more workflow specific characteristics comprise a workflow event identifier, a workflow instruction identifier, a workflow event date or time, a workflow instruction date or time, a workflow event detail, or a workflow instruction detail.

7. The method of claim 1, wherein the computational engine comprises a rule based engine, an equation based engine, or a fuzzy logic engine, and the computational engine comprises one or more modules that can be replaced or modified without replacing or modifying an entirety of the computational engine, the one or more modules implementing one or more rules, equations, or fuzzifying functions of the rule based engine, equation based engine, or fuzzy logic engine.

8. The method of claim 1, further comprising determining whether the quality metric is below a threshold, and, in response to determining the quality metric is below the threshold, determining one or more corrective recommendations based on the one or more quality characteristics; and displaying, via a display screen, the one or more corrective recommendations.

9. The method of claim 8, further comprising executing one or more corrective actions based on the one or more corrective recommendations, the one or more corrective actions comprising adjusting a setting of a power supply or welding tool, disabling the welding tool, locking a clamp that holds the part, or moving the part into a scrap bin.

10. The method of claim 1, wherein the quality metric comprises a first quality metric, the part comprises a first part, and the method further comprises:
  determining a quality comparison between the first part and a second part based on the first quality metric and a second quality metric;
  determining one or more corrective recommendations based on the quality comparison; and
  executing one or more corrective actions based on the one or more corrective recommendations.

11. A system for determining part quality, comprising:
  processing circuitry; and
  a computer readable storage device comprising computer readable instructions which, when executed, cause the processing circuitry to:
    capture, via a user interface or a sensor, one or more feature characteristics relating to a part assembly process for a part, the part assembly process or the part comprising a plurality of workpieces, and the one or more feature characteristics comprising one or more part specific characteristics,
    the one or more part specific characteristics comprising a number of expected welds, a number of completed welds, a number of false arcs, a number of extra welds, a number of pre-part welds, a number of post-part welds, a time interval between successive welds, a clamp time, a total deposited filler amount, or a total gas amount used;
    determine one or more quality characteristics of the part based on the one or more feature characteristics; and
    assign a quality metric to the part based on the one or more quality characteristics.

12. The system of claim 11, wherein each of the one or more quality characteristics comprise a number between 0 and 100, and the quality metric is additionally assigned based on one or more weights applied to the one or more quality characteristics.

13. The system of claim 11, wherein the part is formed during the part assembly process by assembling together the plurality of workpieces via a plurality of welds.

14. The system of claim 12, wherein a computational engine is used to determine the one or more quality characteristics, or assign or the quality metric, wherein the computational engine comprises one or more of a rule based engine, an equation based engine, a fuzzy logic engine, or a machine learning engine, and the computational engine comprises one or more modules that can be replaced or modified without replacing or modifying an entirety of the computational engine, the one or more modules implementing the one or more weights.

15. The system of claim 11, wherein the computer readable storage device comprises computer readable instructions which, when executed, further cause the processing circuitry to determine a color, or grade indicative of the overall quality of the part based on the quality metric.

16. The system of claim 12, wherein the quality metric comprises a number between 0 and 100.

17. The system of claim 11, wherein the computer readable storage device comprises computer readable instructions which, when executed, further cause the processing circuitry to determine one or more corrective recommendations based on a quality characteristic that negatively impacted the quality metric, the one or more quality characteristics comprising the quality characteristic.

18. The system of claim 11, wherein the computer readable storage device comprises computer readable instructions which, when executed, further cause the processing circuitry to determine one or more corrective recommendations based on a quality characteristic that positively impacted the quality metric, the one or more quality characteristics comprising the quality characteristic.

19. The system of claim 17, wherein the computer readable storage device comprises computer readable instructions which, when executed, further cause the processing circuitry to execute one or more corrective actions based on the one or more corrective recommendations, the one or more corrective actions comprising adjusting a setting of a power supply or welding tool, disabling the welding tool, locking a clamp that holds the part, or moving the part into a scrap bin.

20. A system for determining part quality, comprising:
  processing circuitry; and
  a computer readable storage device comprising computer readable instructions which, when executed, cause the processing circuitry to:
    capture, via a user interface or a sensor, one or more feature characteristics relating to a part assembly process for a first part, the part assembly process or the first part comprising a plurality of workpieces,
    determine one or more quality characteristics of the first part based on the one or more feature characteristics,
    assign a quality metric to the first part based on the one or more quality characteristics,
    determine a quality comparison between the first part and a second part based on the first quality metric and a second quality metric,
    determine one or more corrective recommendations based on the quality comparison, and
    execute one or more corrective actions based on the one or more corrective recommendations.

* * * * *